(12) United States Patent
Kim et al.

(10) Patent No.: US 11,685,044 B2
(45) Date of Patent: Jun. 27, 2023

(54) ACTUATOR AND ACTIVE PLATE HAVING THE SAME

(71) Applicant: KOREA INSTITUTE OF SCIENCE AND TECHNOLOGY, Seoul (KR)

(72) Inventors: Sohyun Kim, Seoul (KR); Youngsu Cha, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 17/474,384

(22) Filed: Sep. 14, 2021

(65) Prior Publication Data

US 2022/0088774 A1 Mar. 24, 2022

(30) Foreign Application Priority Data

Sep. 22, 2020 (KR) ........................ 10-2020-0122324

(51) Int. Cl.
*B25J 9/14* (2006.01)
*F15B 21/06* (2006.01)
*F15B 15/10* (2006.01)
*B25J 15/00* (2006.01)

(52) U.S. Cl.
CPC ........... *B25J 9/142* (2013.01); *B25J 15/0023* (2013.01); *F15B 15/10* (2013.01); *F15B 21/065* (2013.01)

(58) Field of Classification Search
CPC .. F15B 21/065; F15B 2015/206; F15B 21/06; F15B 13/044; B25J 9/142
See application file for complete search history.

(56) References Cited

U.S. PATENT DOCUMENTS

| 6,288,472 | B1 | 9/2001 | Cabuz et al. |
| 10,995,779 | B2 | 5/2021 | Keplinger et al. |
| 2009/0115285 | A1 | 5/2009 | Najafi et al. |

(Continued)

FOREIGN PATENT DOCUMENTS

| JP | 2008-005888 A | 1/2008 |
| JP | 6132334 B2 | 5/2017 |

(Continued)

OTHER PUBLICATIONS

Mitchell et al., An Easy-to-Implement Toolkit to Create Versatile and High-Perfroamce HASEL Actuators for Untethered Soft Robots, 2019, Adv. Sci. , 1900178. 1-15 (Year: 2019).*

(Continued)

*Primary Examiner* — Abiy Teka
*Assistant Examiner* — Daniel S Collins
(74) *Attorney, Agent, or Firm* — Rabin & Berdo, P.C.

(57) ABSTRACT

The present disclosure provides an actuator including a pouch which is sealed and formed with an asymmetric structure, a dielectric fluid which is filled in the pouch, and an electrode which is attached to one surface of the pouch and the other surface opposite the one surface, wherein the pouch includes a first part provided on one side and having a predetermined area, and a second part provided on the other side opposite the one side and having a smaller area than the first part, and when power is applied to the electrodes, the first part or the second part of the pouch is expandable by movement of the dielectric fluid due to the asymmetric structure, and an active plate having the same.

8 Claims, 26 Drawing Sheets

(56) References Cited

U.S. PATENT DOCUMENTS

2010/0203686 A1  8/2010  Pribat et al.
2020/0256357 A1* 8/2020  Rowe ..................... F15B 15/10

FOREIGN PATENT DOCUMENTS

KR    10-1261019 B1   5/2013
KR    10-2151653 B1   9/2020

OTHER PUBLICATIONS

Daniel Leithinger et al., "Shape Displays: Spatial Interaction with Dynamic Physical Form," IEEE Computer Graphics and Applications, vol. 35, Issue 5, pp. 5-11, Sep. 23, 2015.
Heeseung Bang et al., "Embedded Model Predictive Control for Enhancing Tracking Performance of a Ball-and-Plate System," IEEE Access, vol. 7, pp. 39652-39659, Mar. 25, 2019.
Shane K. Mitchell et al., "An Easy-to-Implement Toolkit to Create Versatile and High-Performance HASEL Actuators for Untethered Soft Robots," Advanced Science, vol. 6, No. 1900178, pp. 1-15, Jun. 11, 2019.
Nicholas Kellaris et al., "Peano-HASEL actuators: Muscle-mimetic, electrohydraulic transducers that linearly contract on activation," Science Robotics, Jan. 5, 2018, vol. 3, pp. 1-10.
Po-Wen Lin et al., "Bio-Inspired Soft Proboscis Actuator Driven by Dielectric Elastomer Fluid Transducers," Polymers Jan. 15, 2019, vol. 11, No. 142, pp. 1-17.

* cited by examiner

FIG. 11

|         | Amp 1 | Amp 2 | Amp 3 | Amp 4 |
|---------|-------|-------|-------|-------|
| Area (a) | OFF  | OFF   | ON    | OFF   |
| Area (b) | OFF  | OFF   | ON    | ON    |
| Area (c) | OFF  | OFF   | OFF   | ON    |
| Area (d) | ON   | OFF   | OFF   | ON    |
| Area (e) | ON   | OFF   | OFF   | OFF   |
| Area (f) | ON   | ON    | OFF   | OFF   |
| Area (g) | OFF  | ON    | OFF   | OFF   |
| Area (h) | OFF  | ON    | ON    | OFF   |

ACTUATOR AND ACTIVE PLATE HAVING THE SAME

CROSS-REFERENCE TO RELATED APPLICATION

This application claims a priority of Korean Patent Application No. 10-2020-0122324, filed on Sep. 22, 2020, and all the benefits accruing therefrom under 35 U.S.C. § 119, the contents of which in their entirety are herein incorporated by reference.

TECHNICAL FIELD

The present disclosure relates to an actuator and an active plate having the same, and more particularly, to an asymmetric electrohydraulic based actuator and an active plate having the same.

DESCRIPTION ABOUT NATIONAL RESEARCH AND DEVELOPMENT SUPPORT

This study was supported by the Personal Basic Science Research (MSIT) (R&D) of the National Research Foundation of Korea, the Ministry of Science and ICT (Development of soft robot module based on electro-hydraulic actuator, Project No. 1711111923) under the sponsorship of Korea Institute of Science and Technology.

BACKGROUND ART

The aim of soft robots research is to develop advanced technologies using new robotic mechanisms based on soft materials and structures to increase flexibility.

Soft robots are widely used in robotics, medical applications and field exploration. In particular, soft robots have a wide range of applications including biomimetric robots, wearable devices and robotic arms. Today, soft actuators are essential for promoting the development of soft robots. General types of soft actuators include shape memory alloy actuators (SMAs), soft pneumatic actuators (SPAs) and dielectric elastomer actuators (DEAs).

The SMAs provide high force, light weight, flexibility and work density. The SPAs achieve high force and high strokes, thereby easily realizing desired shapes and motions. The DEAs provides large actuation deformation and high speed actuation.

However, the SMAs have low efficiency and low deformation rate and require high current. The SPAs need an external pressure source that limits portability. Additionally, the DEAs need strong electric fields for driving the actuators.

Recently, new approaches for solving the problems by combining the advantages of each technology are known. Such researches simultaneously use the electrostatic force and the hydraulic pressure acting on liquid dielectrics without external pressure sources. Additionally, several moving plates and tables based on solid actuators are known. One of the most common platforms for this type of control is a Stewart platform that controls the movement of objects on the surface. Another proposed adaptive active surface provides dynamic properties that change the shape, size, location and direction of solid actuators.

The use of the platforms is useful for interactions between humans and robots, but their limitations are stiffness matrix, large thickness and large size.

RELATED LITERATURES

Patent Literatures (Patent Literature 1) KR Patent No. 10-1261019 (2013.5.6)

DISCLOSURE

Technical Problem

The present disclosure is invented to solve the above-described problem, and therefore the present disclosure is directed to providing a device for creating many types of deformations using asymmetric electrodes of an actuator by applying voltages to the asymmetric electrodes.

Technical Solution

To solve the above-described problem, an actuator of the present disclosure includes a pouch which is sealed and formed with an asymmetric structure, a dielectric fluid which is filled in the pouch, and an electrode which is attached to one surface of the pouch and the other surface opposite the one surface, wherein the pouch includes a first part provided on one side and having a predetermined area, and a second part provided on the other side opposite the one side and having a smaller area than the first part, and when power is applied to the electrodes, the first part or the second part of the pouch is expandable by movement of the dielectric fluid due to the asymmetric structure.

According to an example related to the present disclosure, the electrodes may include a first electrode attached to one surface of the first part and the other surface opposite the one surface, and a second electrode attached to one surface of the second part and the other surface opposite the one surface.

The pouch may be formed by thermal bonding of two films.

The dielectric fluid may be mineral oil.

To solve the above-described other problem, an active plate of the present disclosure includes the actuator and a backing which is connected to the actuator, wherein a plurality of actuators is provided, and power applied to at least one actuator puts the actuators into operation.

The plurality of actuators may be arranged adjacent to each other.

According to an example related to the present disclosure, the backing may have a circular shape, and the plurality of actuators may be radially arranged on the circular backing.

The plurality of actuators may be configured such that the first and second parts of each actuator are arranged in a sequential order.

According to another example related to the present disclosure, the active plate of the present disclosure may further include a housing which is coupled to the backing, and a ball moveably positioned in the housing to move by actuation of the plurality of actuators.

Advantageous Effects

The actuator of the present disclosure may work without an external fluid pressure source.

Additionally, the actuator and the active plate of the present disclosure may be used for various purposes including soft robots, mobile robots and manipulators.

Additionally, the actuator and the active plate of the present disclosure may be used in active tables that freely actuate on wide substrates.

DESCRIPTION OF DRAWINGS

FIG. 11 is a table showing ON/OFF of Amp 1 to 4 at areas (a) to (h) of FIG. 10.

BEST MODE

Hereinafter, the embodiments disclosed herein will be described in detail with reference to the accompanying drawings, and identical or similar elements are given identical or similar reference signs and redundant descriptions are omitted herein. As used herein, the suffix "part" is only given or used to ease the drafting of the specification, and does not have any meaning or role for distinguishing itself. Additionally, in describing the embodiments disclosed herein, when it is determined that a certain detailed description of relevant known technology may make the key subject matter of the disclosed embodiments ambiguous, the detailed description is omitted herein. Additionally, the accompanying drawings are provided for an easy understanding of the disclosed embodiments, and the technical spirit disclosed herein is not limited by the accompanying drawings, and it should be understood that the present disclosure covers all modifications, equivalents or substitutes falling in the spirit and technical scope of the present disclosure.

The terms "first", "second", and the like may be used to describe various elements, but the elements are not limited by the terms. These terms are used to distinguish one element from another.

It should be understood that when an element is referred to as being "connected to" another element, the element can be directly connected to the other element, but intervening elements may be present.

Unless the context clearly indicates otherwise, the singular forms as used herein include the plural forms as well.

It should be understood that the term "comprises" or "includes" when used in this specification, specifies the presence of stated features, integers, steps, operations, elements, components or groups thereof, but does not preclude the presence or addition of one or more other features, integers, steps, operations, elements, components or groups thereof.

Figure 1:
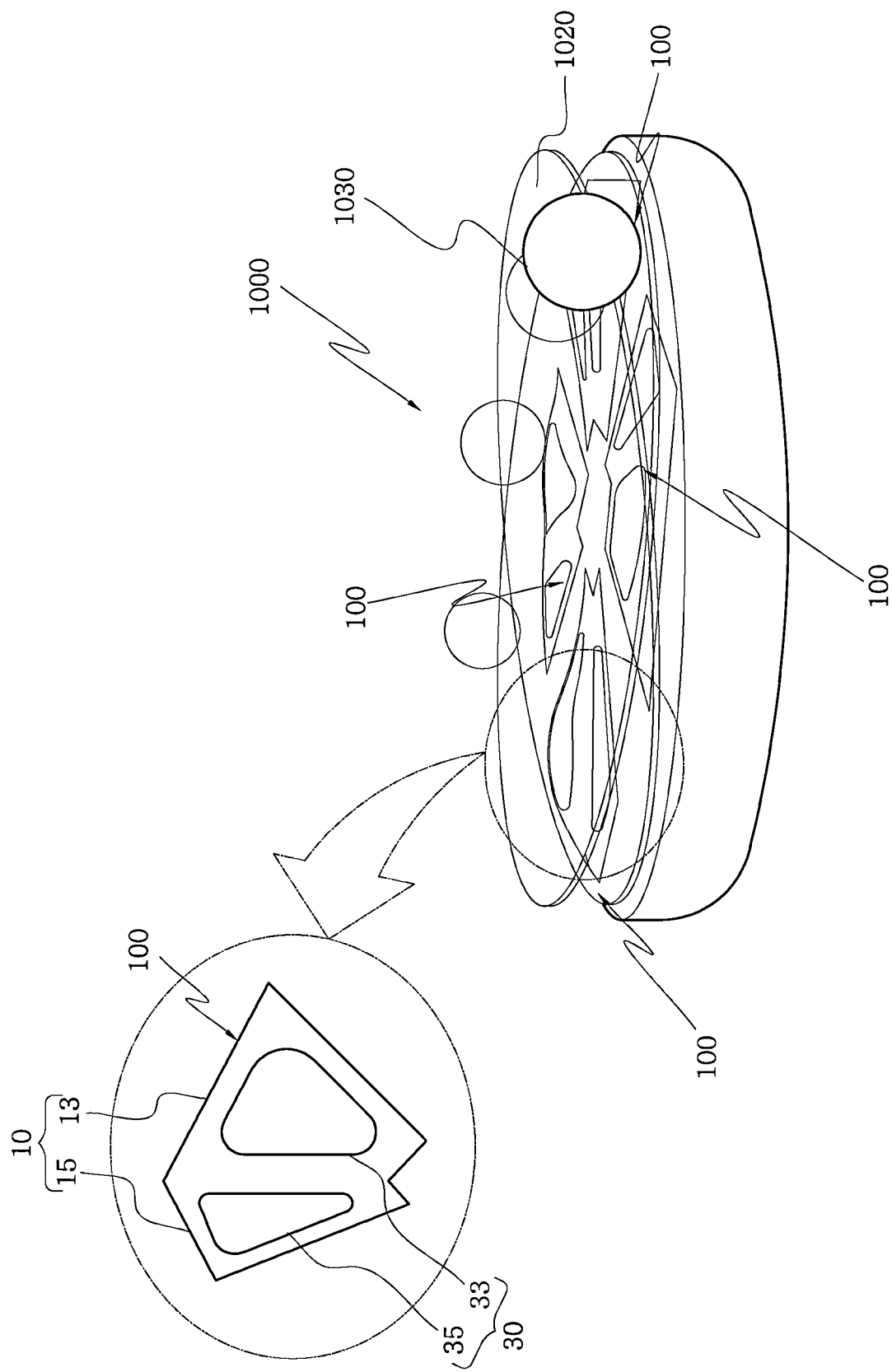
FIG. 1 is a perspective view showing an actuator of the present disclosure and an active plate having the same.
Figure 2A:
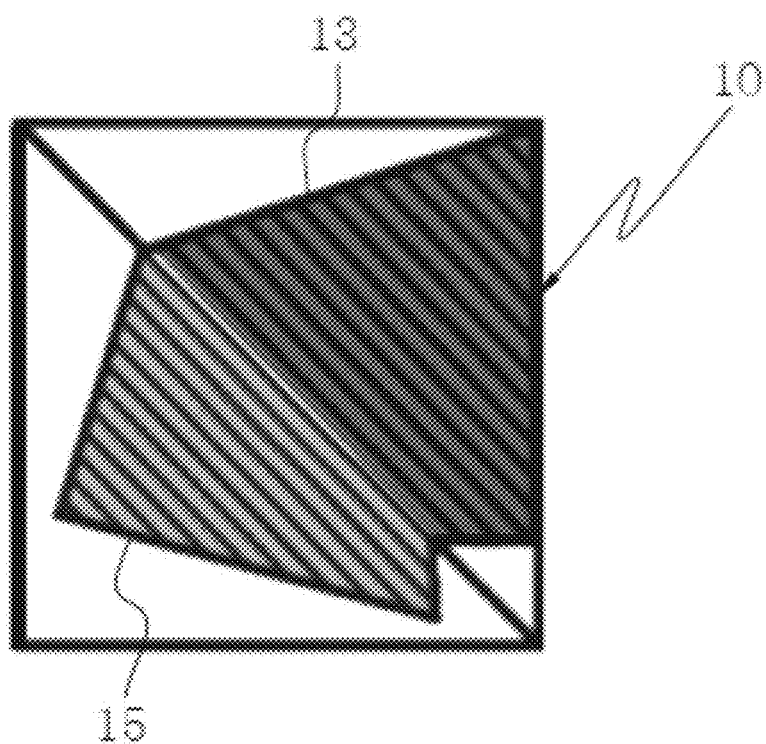
FIG. 2A is a conceptual diagram showing a first part and a second part of a pouch of an actuator.
Figure 2B:
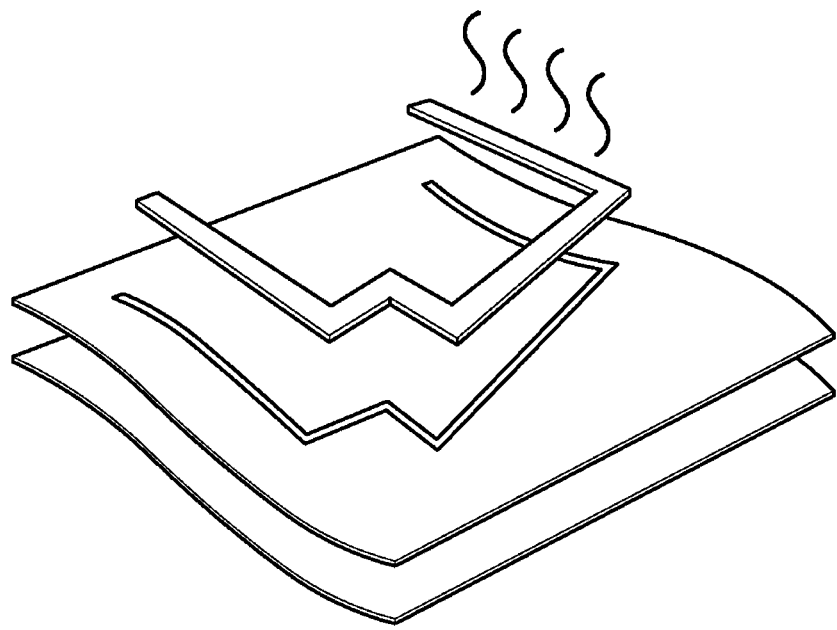
FIG. 2B is a conceptual diagram showing an example of thermal bonding of two films for fabrication of a pouch.
Figure 2C:
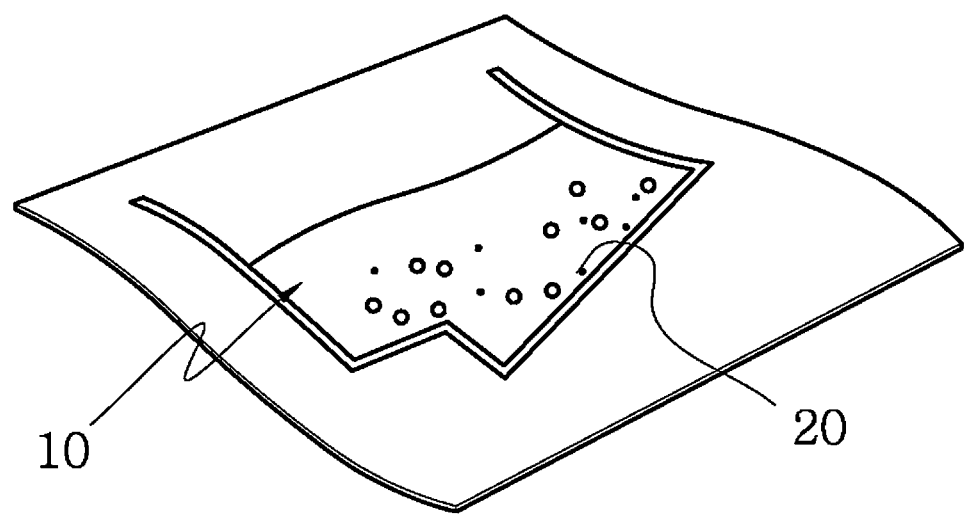
FIG. 2C is a conceptual diagram showing an example of injection of a dielectric fluid into a pouch.
Figure 2D:
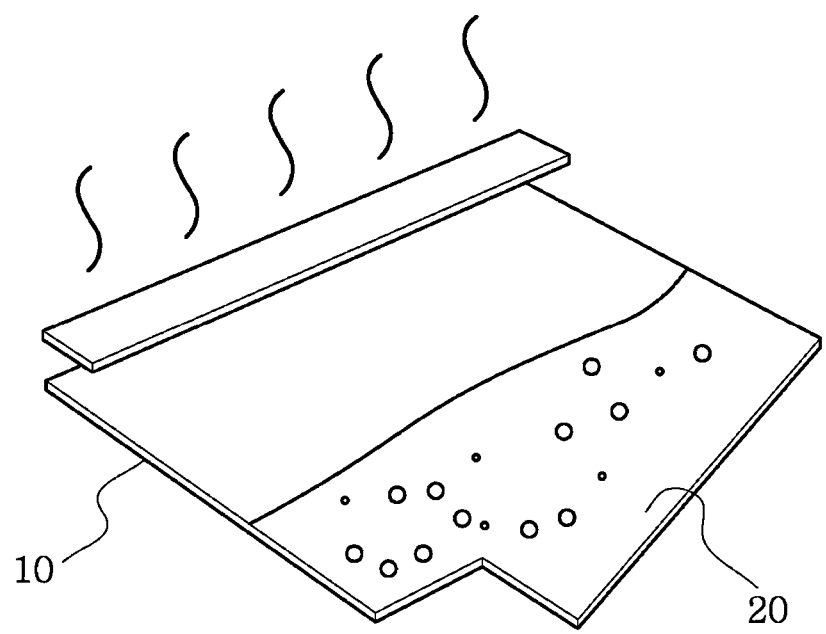
FIG. 2D is a conceptual diagram showing an example of sealing a pouch by thermal bonding.
Figure 2E:
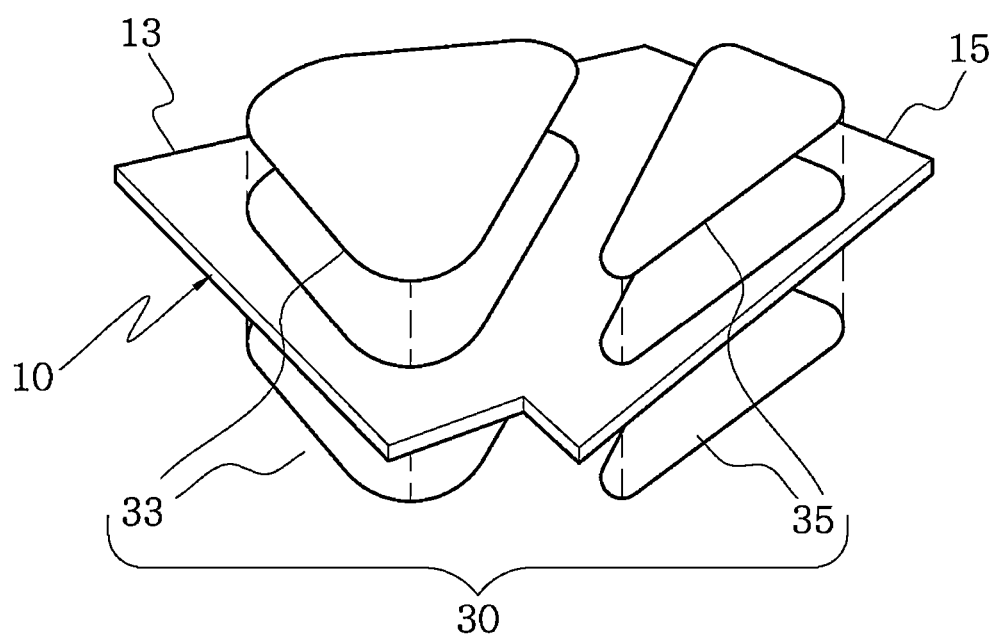
FIG. 2E is a conceptual diagram showing an example of attachment of electrodes to a pouch.

FIG. 1 is a perspective view showing an actuator 100 of the present disclosure and an active plate 1000 having the same. Additionally, FIG. 2A is a conceptual diagram showing a first part 13 and a second part 15 of a pouch 10 of the actuator 100, and FIG. 2B is a conceptual diagram showing an example of thermal bonding of two films for fabrication of the pouch 10. Additionally, FIG. 2C is a conceptual diagram showing an example of injection of a dielectric fluid 20 into the pouch 10, FIG. 2D is a conceptual diagram showing an example of sealing the pouch 10 by thermal bonding, and FIG. 2E is a conceptual diagram showing an example of attachment of electrodes 30 to the pouch 10.

The structure of the actuator 100 of the present disclosure and the active plate 1000 having the same will be described with reference to FIGS. 1 to 2E.

The actuator 100 of the present disclosure may be a hydraulic actuator 100.

The actuator 100 of the present disclosure includes the pouch 10, the dielectric fluid 20 and the electrodes 30.

The pouch 10 is sealed, and is formed with an asymmetric structure.

Additionally, the pouch 10 includes a first part 13 and a second part 15.

The first part 13 is provided on one side of the pouch 10, and has a predetermined area.

The second part 15 is provided on the other side opposite the one side, and has a smaller area than the first part 13.

In the present disclosure, the first part 13 has a larger area and thus may be referred to as a large area part, and the second part 15 has a smaller area and thus may be referred to as a small area part.

The pouch 10 may be formed by thermal bonding of two films, so that the pouch 10 may be sealed.

The films that form the pouch 10 may be an oriented polypropylene (OPP) film.

The dielectric fluid 20 is filled in the pouch 10.

The dielectric fluid 20 may be mineral oil.

The electrodes 30 are attached to one surface of the pouch 10 and the other surface opposite the one surface.

When power is supplied to the electrodes 30, the first part 13 or the second part 15 of the pouch 10 may expand by the movement of the dielectric fluid 20 due to the asymmetric structure of the pouch 10

In more detail, when power is supplied to the electrodes 30, the electrodes 30 of different polarities come closer by the attractive force between them, and the dielectric fluid 20 between the electrodes 30 moves to the opposite side by the attractive force between the electrodes 30.

The electrodes 30 may include a first electrode 33 and a second electrode 35.

The first electrode 33 may be attached to one surface of the first part 13 and the other surface opposite the one surface.

The second electrode 35 may be attached to one surface of the second part 15 and the other surface opposite the one surface.

For example, when power is applied to the first electrode 33 positioned in the first part 13, the dielectric fluid 20 disposed on the first part 13 side moves toward the second part 15, and accordingly, the second part 15 expands.

On the contrary, when power is applied to the second electrode 35 positioned in the second part 15, the dielectric fluid 20 disposed on the second part 15 side moves toward the first part 13, and accordingly, the first part 13 expands.

Meanwhile, the active plate 1000 of the present disclosure includes the above-described actuator 100 and a backing 1020.

The backing 1020 is connected to the actuator 100. Additionally, the backing 1020 is disposed under the object or the housing and supports an object or a housing. The backing 1020 may be, for example, a polyvinyl chloride (PVC) film.

The backing 1020 has, for example, a circular shape.

A plurality of actuators 100 is provided, and power applied to at least one of the plurality of actuators 100 puts the actuators 100 into operation. In more detail, power applied to the first electrode 33 or the second electrode 35 of at least one of the plurality of actuators 100 may put the actuators 100 into operation.

The plurality of actuators 100 may be arranged adjacent to each other. Additionally, the plurality of actuators 100 may be radially arranged on the circular backing 1020, and the arrangement structure is not necessarily limited thereto.

Additionally, the plurality of actuators 100 may be configured such that the first part and the second part 15 of each actuator 100 are arranged in a sequential order.

Meanwhile, the active plate 1000 of the present disclosure may further include a housing and a ball 1030.

The housing may be coupled to the backing 1020. Although not clearly shown in the drawing, the housing may have a hemispheric shape. Additionally, the housing may be understood as a bowl structure of a transparent material to prevent the ball from escaping and observe the movement of the ball from the outside.

The ball 1030 is moveably positioned in the housing, and when power is applied to some of the plurality of actuators 100, the backing 1020 has a height change and is tilted, and accordingly the ball 1030 may move.

Hereinafter, an example of a method for fabricating the actuator 100 of the present disclosure will be described with reference to FIGS. 2A to 2E.

Referring to FIG. 2A, an OPP film (e.g. 30 μm) of unique design for fabrication of the actuator 100 is prepared. The design of the actuator 100 may be asymmetric, and the actuator 100 may be divided into a small area part and a large area part.

Referring to FIG. 2B, two films are bonded using a thermal bonder except an injection port for liquid replenishment along the layout of the design. The adhesive width bonded by heating may be 2 mm.

Subsequently, referring to FIG. 2C, the dielectric fluid 20 is injected into the pouch 10 formed by the two films. The dielectric fluid 20 may be mineral oil, and for example, 1.4 mL of mineral oil may be injected into the pouch 10.

Subsequently, referring to FIG. 2D, after bubbles in the pouch 10 are removed, the pouch 10 is completely sealed to prevent leaks. Additionally, the peripheral margins of the pouch 10 are cut out.

Additionally, referring to FIG. 2E, a carbon tape is attached to each surface of the pouch 10, and the carbon tape has flexibility and conductive properties.

A small triangular tape is attached to the top and bottom of the small area part and a large triangular tape is attached to the large area part.

The tape has rounded edges to prevent electric charges from being accumulated at sharp locations when electric shorts occur due to high electric fields. The electrodes 30 may be formed in the largest size so that each segment may exert the maximum force without electric shorts.

Additionally, electronic settings for testing the actuator 100 are performed as follows. A high voltage converter is used to apply 6 kV input to each actuator 100. (+) and (−) ports of one high voltage converter are connected to the electrode 30 of the large area part. Additionally, (+) and (−) ports of the other high voltage converter are connected to the electrode 30 of the small area part.

A controller (Arduino-Uno board) is connected to the high voltage converters to determine the control voltage of the high voltage converters. For discharge, a thick film resistor is connected between the output ports of the converters. The thick film resistor may be 50 MΩ.

Figure 3A:
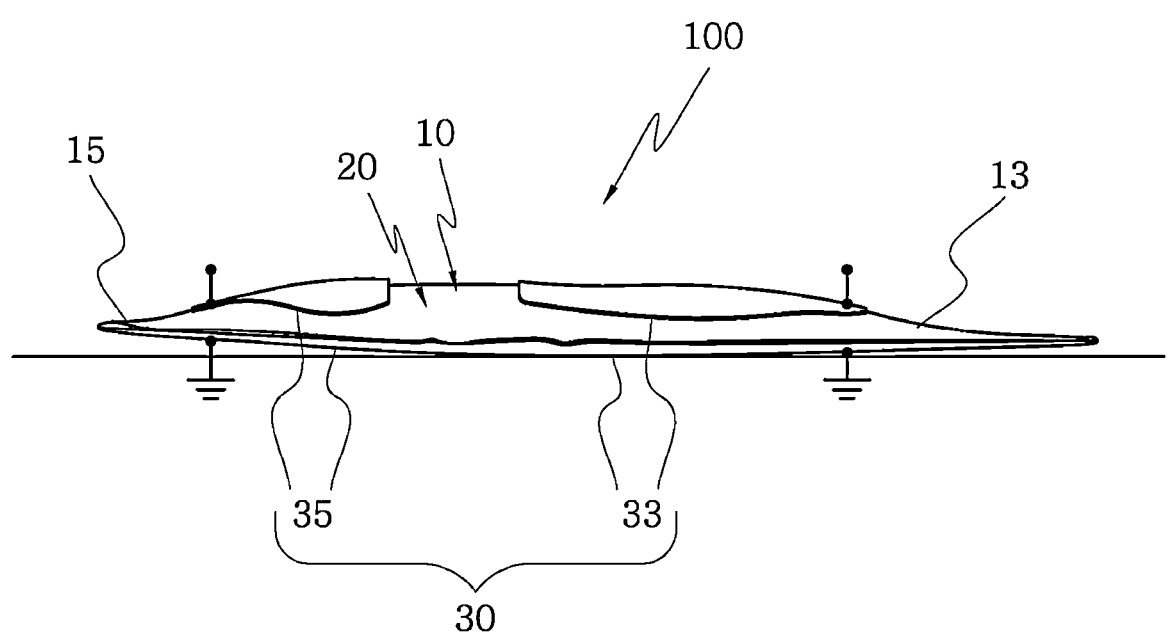
FIG. 3A is a conceptual diagram showing an example of equilibrium before the application of voltage to electrodes of an actuator.
Figure 3B:
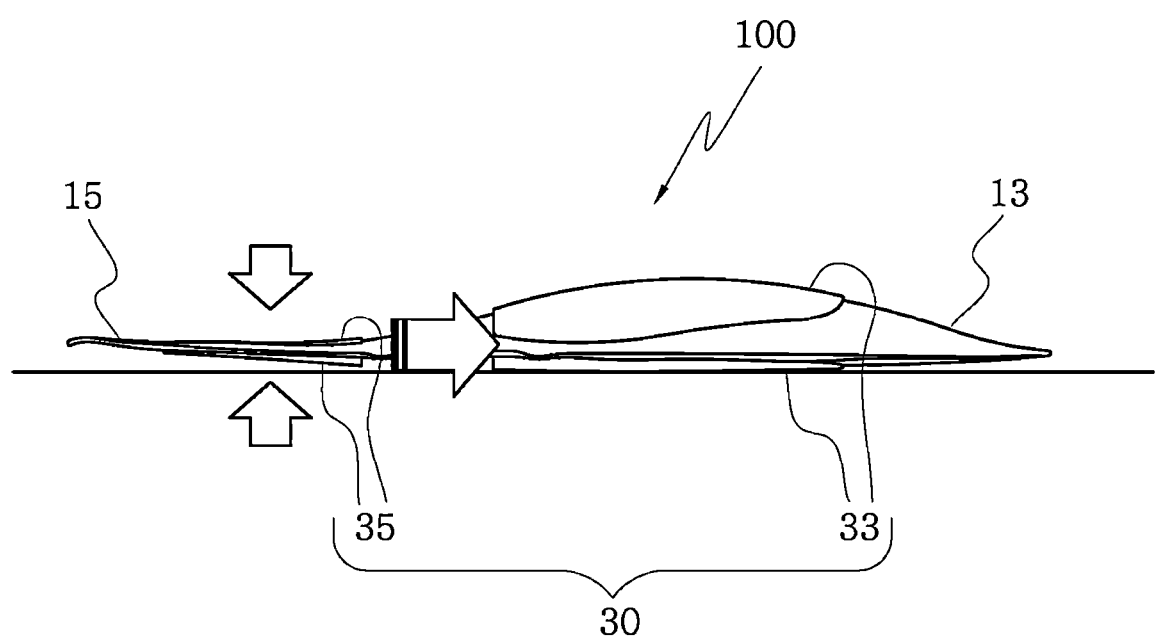
FIG. 3B is a conceptual diagram showing an example of expansion of a first part (a large area part) by the application of voltage to a second electrode (a small area part).
Figure 3C:
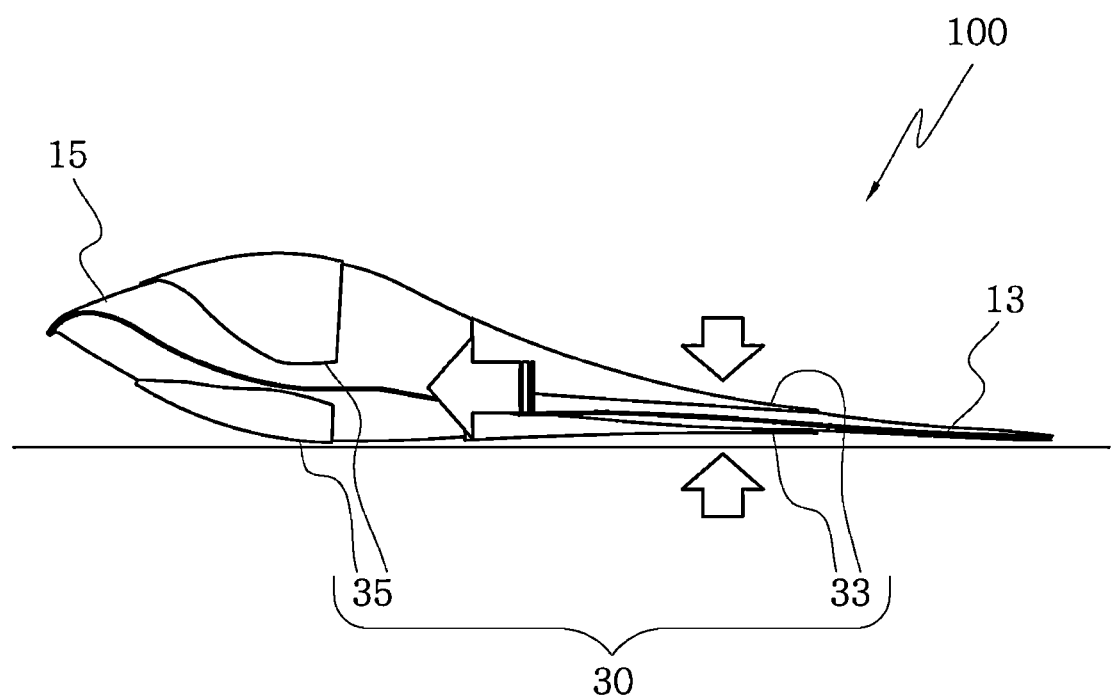
FIG. 3C is a conceptual diagram showing an example of expansion of a second part (a small area part) by the application of voltage to a first electrode (a large area part).

FIG. 3A is a conceptual diagram showing an example of equilibrium before the application of voltage to the electrodes 30 of the actuator 100, FIG. 3B is a conceptual diagram showing an example of expansion of the first part 13 (the large area part) by the application of voltage to the second electrode 35 (the small area part), and FIG. 3C is a conceptual diagram showing an example of expansion of the second part 15 (the small area part) by the application of voltage to the first electrode 33 (the large area part).

Hereinafter, the operation of the actuator 100 and the active plate 1000 of the present disclosure will be described with reference to FIGS. 3A to 3C.

In FIG. 3A, the actuator 100 at the area attached to the substrate works by the principles of electrostatics and hydraulics. In particular, when the voltage input is applied to the small area part, the top and bottom electrodes 30 gradually attract each other through electrostatic forces and push the dielectric fluid 20 to the large area part. FIG. 3B shows an example in which the large area part swells by a small height change since the actuator 100 is sealed.

In contrast, in an ON state in which power is applied to the input of the large area part, the pouch 10 has a volume change from a large height change caused by the movement of the fluid, and this is shown in FIG. 3C.

Accordingly, small and large height changes occur by the ON/OFF state of the asymmetric electrodes 30 of the large area part.

Figure 4A:
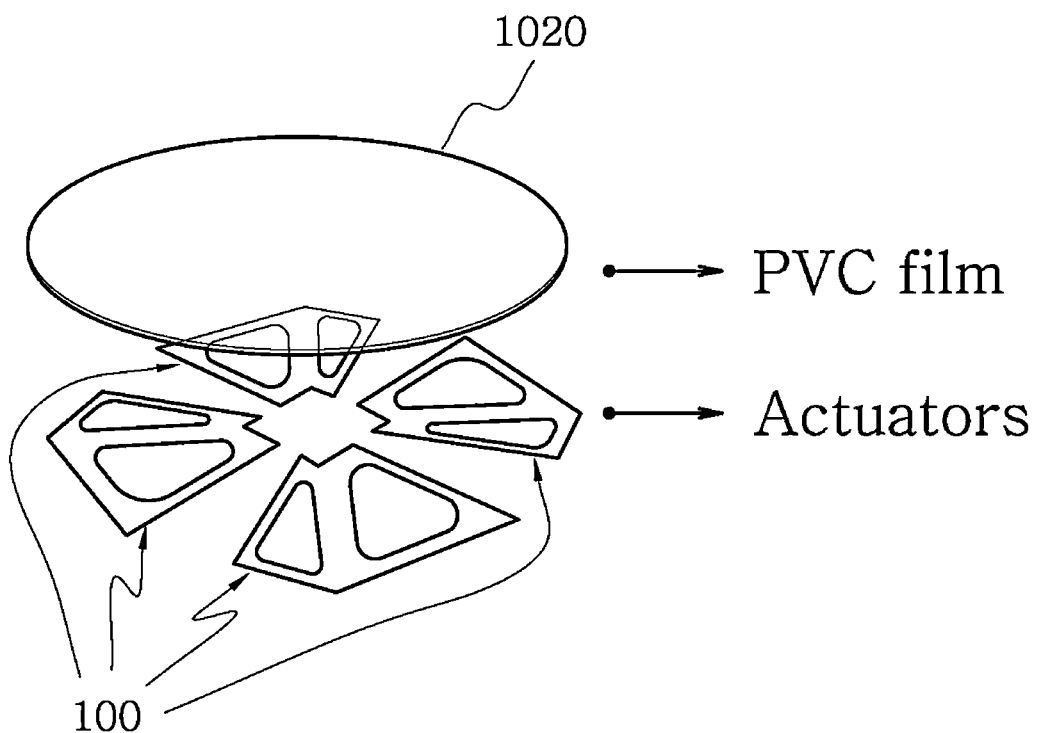
FIG. 4A is an exploded perspective view showing an active plate of the present disclosure.

The active plate 1000 uses the actuation mechanism of the actuator 100 having the above-described height change. The active plate 1000 is tilted by the individual actuation of the actuator 100. In particular, referring to FIG. 4A, the active plate 1000 may include four actuators 100 and a PVC film having the diameter of 100 mm and the thickness of 0.3 mm, and the number and the structure are not necessarily limited thereto.

The four actuators 100 are attached to the quadrants of the PVC film of the active plate 1000 respectively. The inclination of the active plate 1000 changes with the deformation of the four actuators 100. When voltage is not applied to the small area part and the large area part, the actuator 100 has no physical change and the plate keeps flat.

When voltage is applied to the small area part, the large area part slightly increases in size, and the inclination of the plate changes. However, when voltage is applied to the large area part, the pouch 10 of the small area part is raised, forming a steep slope of the plate. That is, when voltage is applied to the small area part or the large area part, the opposite part has a physical change, and the inclination of the plate is determined. The small area part plays a more important role in determining the slope of the plate.

An angle change of the active plate 1000 causes the ball 1030 to rotate. FIG. 4C shows an example of an experiment performed using a polystyrene bowl (a disposable bowl) that prevents an object from falling down. The bowl is attached to the top of the active plate 1000. The bowl is formed with a predetermined internal curvature, so the ball 1030 of FIG. 4C moves along the circular trajectory.

Figure 4B:
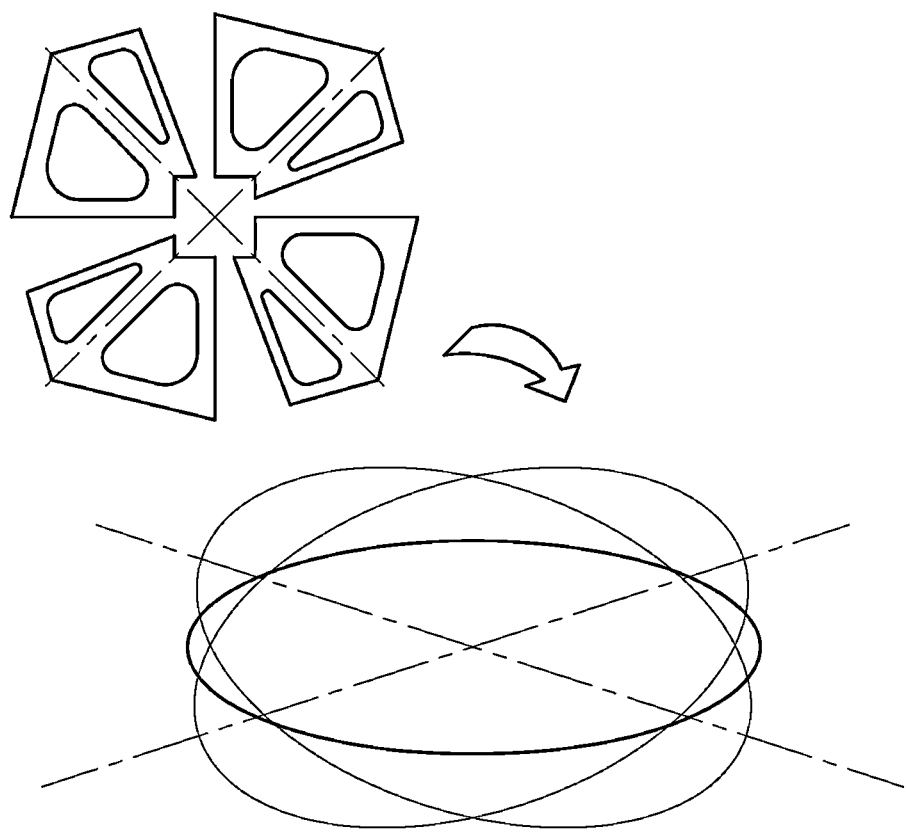
FIG. 4B is a conceptual diagram showing an example of actuators arranged in quadrants of a backing and directional axes of an active plate.
Figure 4C:
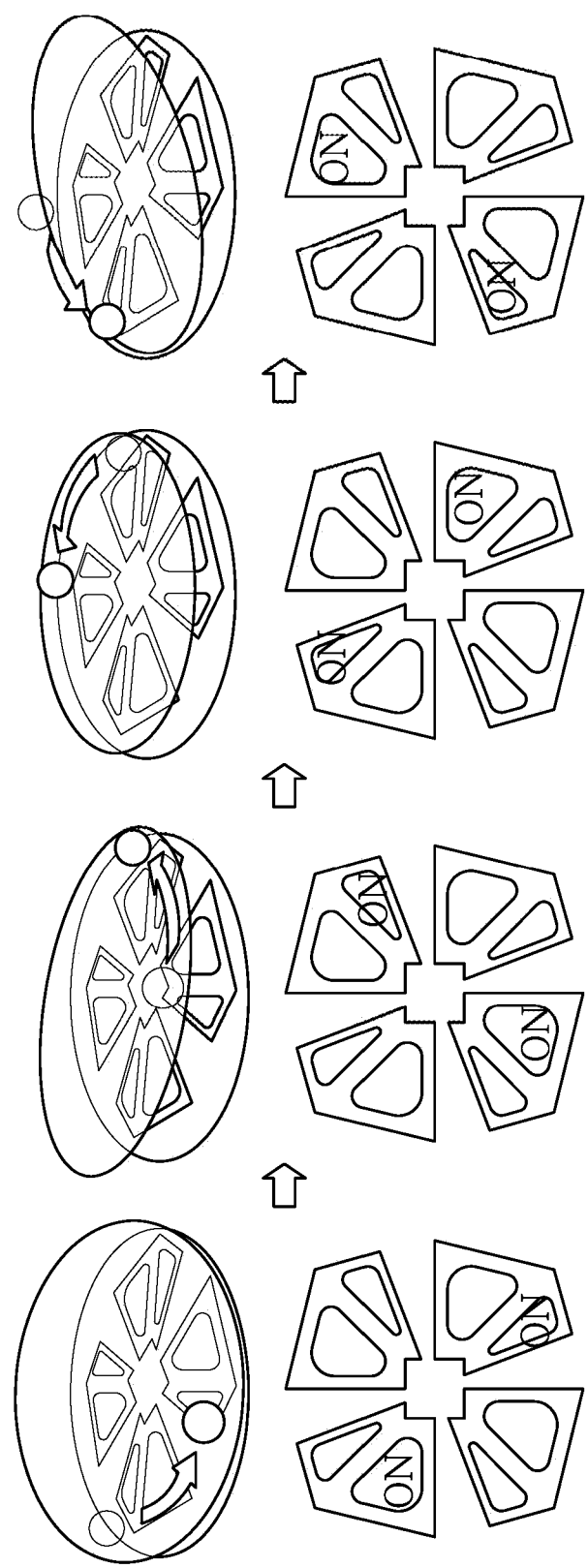
FIG. 4C is a conceptual diagram showing an example of the movement of a ball by the sequential actuation of some of a plurality of actuators.

In particular, referring to FIG. 4B, when the large area part of one actuator 100 and the small area part of the other actuator 100 are simultaneously turned on among the whole part of eight actuators 100, the active plate 1000 is raised with respect to the tilted axis of rotation. When the large area part is turned on, the inclination of the plate is determined by the expansion of the small area part. The height change of the large area part caused by the actuating small area part adjusts the inclination of the active plate 1000. The inclination of the active plate 1000 provides an environment that allows the ball 1030 to move, but an external force against friction is necessary to move the fixed ball 1030.

Accordingly, when the ball 1030 is moving by an external force and the actuators 100 are activated in a sequential order, the system produces four types of slopes and the ball 1030 rotates along the orbit.

FIG. 4C shows that the ball 1030 rotates in the counterclockwise direction according to a given voltage input sequence. When the small area part and the large area part are formed to the contrary, the ball 1030 may rotate in the clockwise direction. When the inclination of the active plate 1000 is large as the input voltage increases, an external force for the initial operation may be unnecessary.

Although the present disclosure uses the ball 1030 made of glass, the ball 1030 is not limited thereto. The ball 1030 may be 1.5 cm in diameter and 5.04 g in weight, but is not limited thereto. Additionally, the present disclosure may control the stop position of the ball 1030 by changing the inclination of the active plate 1000.

Hereinafter, the results of experiments performed through the actuator 100 and the active plate 1000 of the present disclosure will be described.

A. Actuator 100

The design parameters such as the amount of the fluid or the size of the actuator 100 may limit or improve the operation of the active plate 1000. FIGS. 5A, 5B, 5C, 5D and 5E show the displacement vertically actuating at the center of each of the large area part and the small area part at the actuation frequency of 0.2 Hz, 0.5 Hz, 3 Hz and 8 Hz with varying amounts of the fluid and varying sizes of the actuator 100. In particular, the amount of the dielectric fluid 20 in the pouch 10 may affect the actuation performance due to the actuation by the limited internal fluid.

Figure 5A:
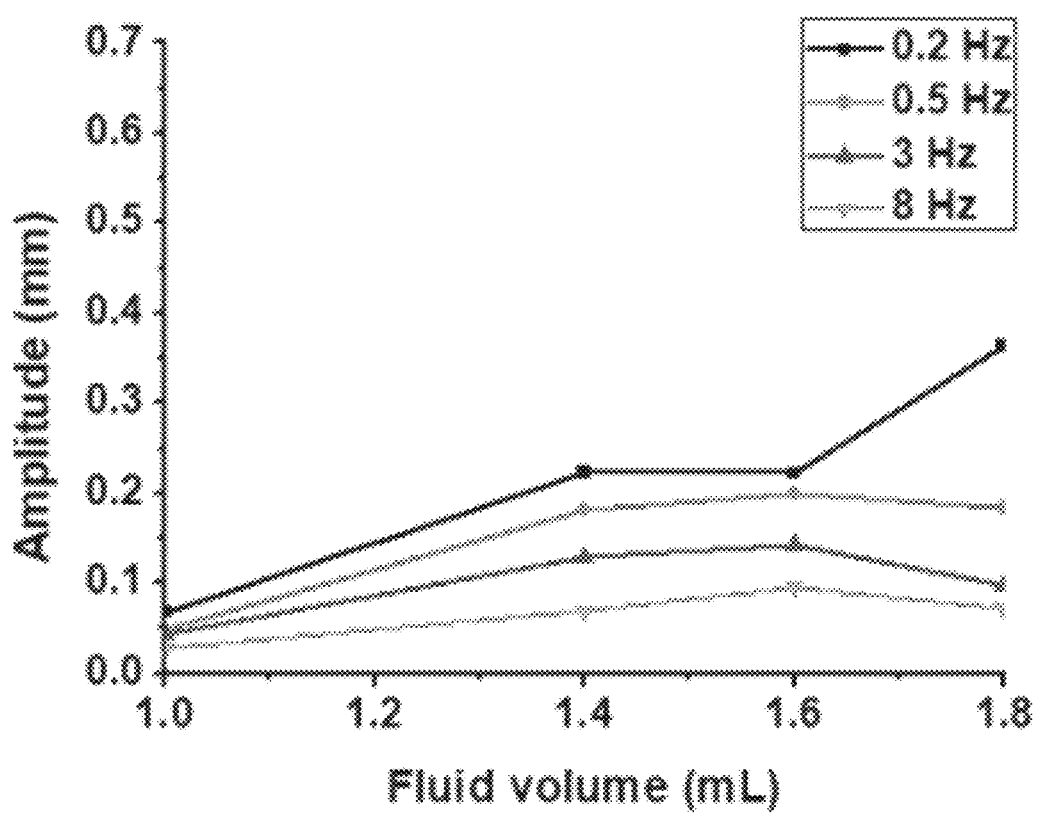
FIG. 5A is a graph showing the displacement of a first part with changes in the input frequency of a second part and the volume of a dielectric fluid.
Figure 5B:
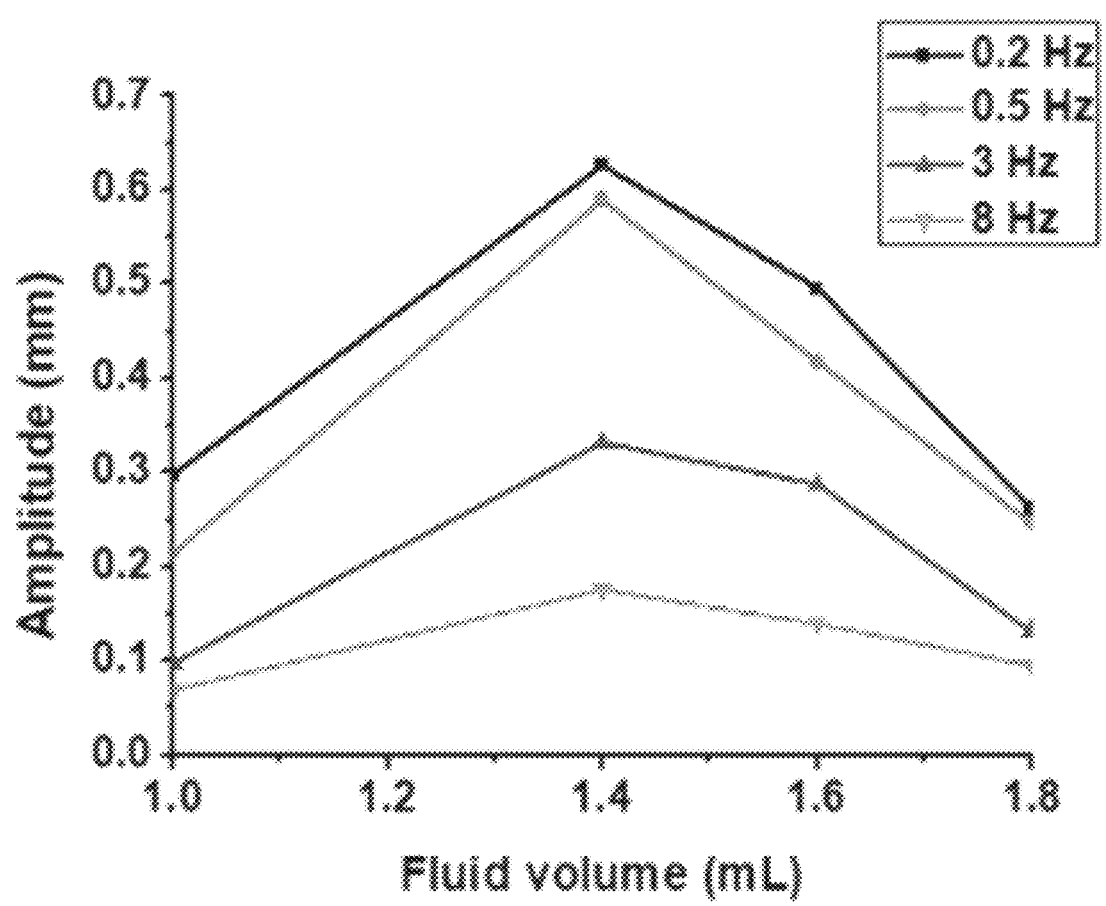
FIG. 5B is a graph showing the displacement of a second part with changes in the input frequency of a first part and the volume of a dielectric fluid.

The fluid is injected in an amount of 1 mL, 1.4 mL, 1.6 mL or 1.8 mL. The displacement of all types of actuators 100 decreases with the increasing frequency. When the fluid volume is 1 mL, the displacement of the large area part is smaller than the other types of actuators 100 (FIG. 5A). When the fluid volume is more than 1.8 mL, in general, a large amount of liquid cannot flow in the limited pouch 10, so there is a tendency of data inconsistency.

Meanwhile, the displacement of the small area part tends to increase with the increasing fluid volume, but when a predetermined amount is reached, the displacement tends to decrease (FIG. 5B), and it is concluded that the actuator 100 injected with 1.4 mL is more effective than the others.

Figure 5C:
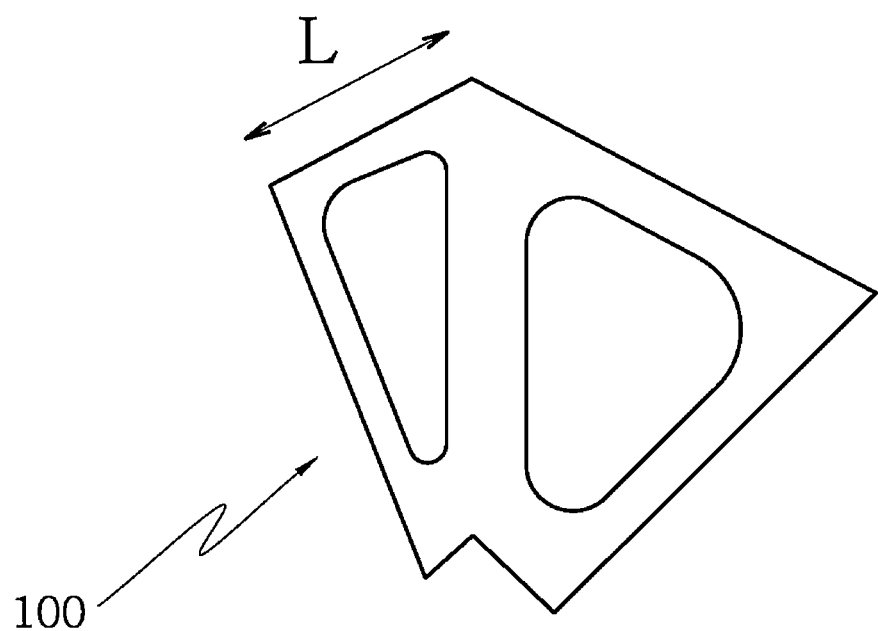
FIG. 5C is a plan view showing the parameter L of an actuator.
Figure 5D:
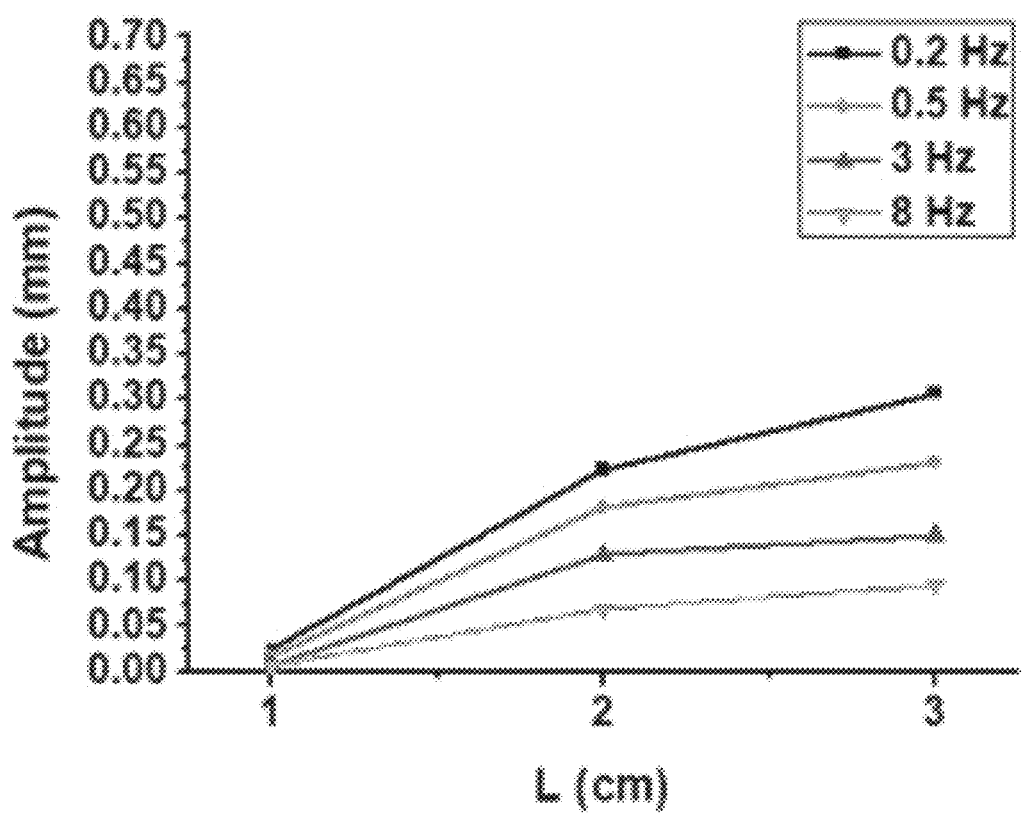
FIG. 5D is a graph showing the displacement of a first part with changes in the input frequency of a second part and the length of L.

Subsequently, as shown in FIG. 5C, the actuation displacement is observed by changing L of the small area part. L is designed to be 1 cm, 2 cm or 3 cm. As L increases, the displacement of the large area part increases (FIG. 5D).

Figure 5E:
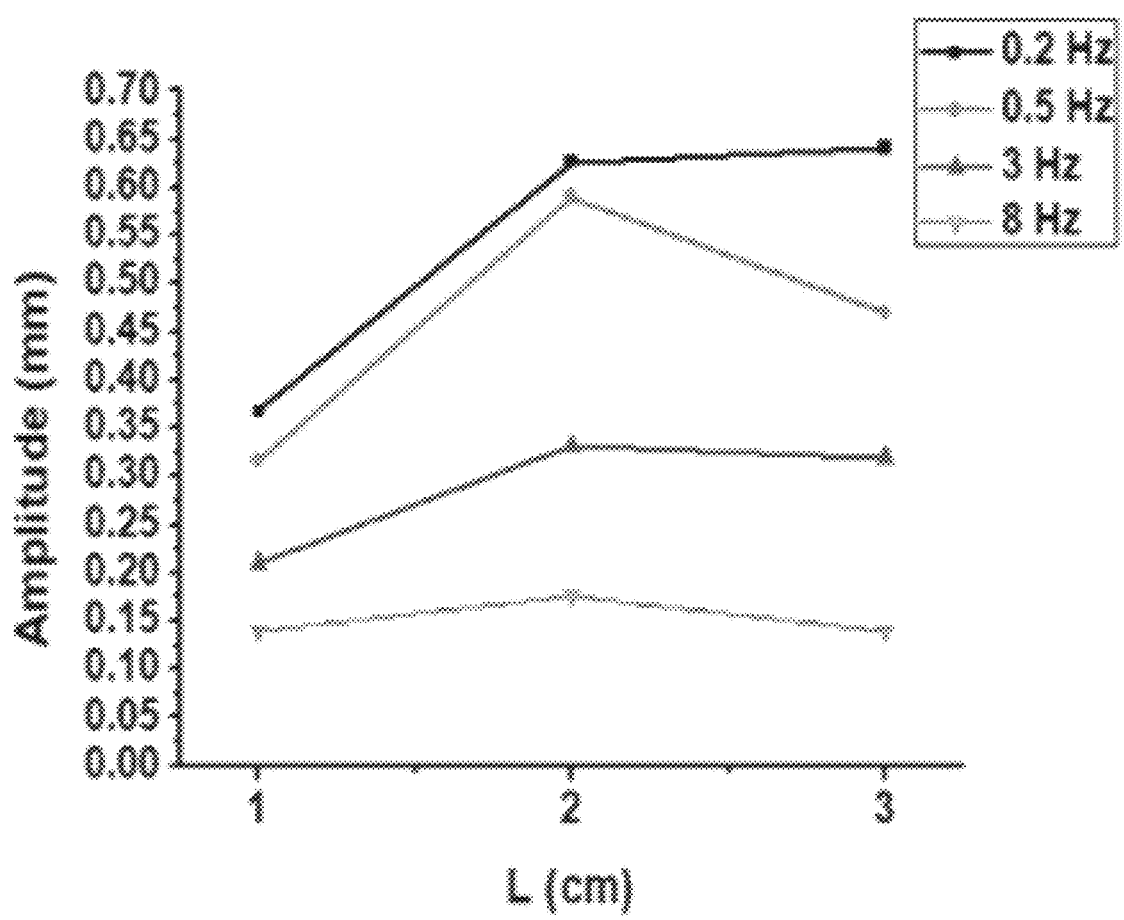
FIG. 5E is a graph showing the displacement of a second part with changes in the input frequency of a first part and the length of L.

In contrast, the displacement of the small area part which is an important factor that determines the inclination of the active plate is the most efficient at 2 cm (FIG. 5E).

The characteristics of each segment of the actuator 100 are experimentally investigated when L is 2 cm and the input voltage value is 6 kV in order to show the performance of the actuator 100. The blocking force of the actuator 100 is measured at the tip of the actuator 100 using a load cell.

The blocking force of the large area part and the small area part is 0.018 N and 0.1154 N respectively. When the electrode 30 of the small area part is activated, a small force is generated, and when the electrode 30 of the large area part is activated, a large force is generated. At the tip of each area, the maximum deformation rate of the small area part is 25%, and 13% deformation is achieved in the large area part.

The actuation displacement is investigated by changing the frequency of the input voltage signal. The movement of the actuator 100 is detected in real time using a high speed 2D laser scanner. Data is collected through 2000 line scans per second. The ON/OFF frequency of the actuator 100 ranges from 0.1 Hz to 10 Hz.

Figure 6:
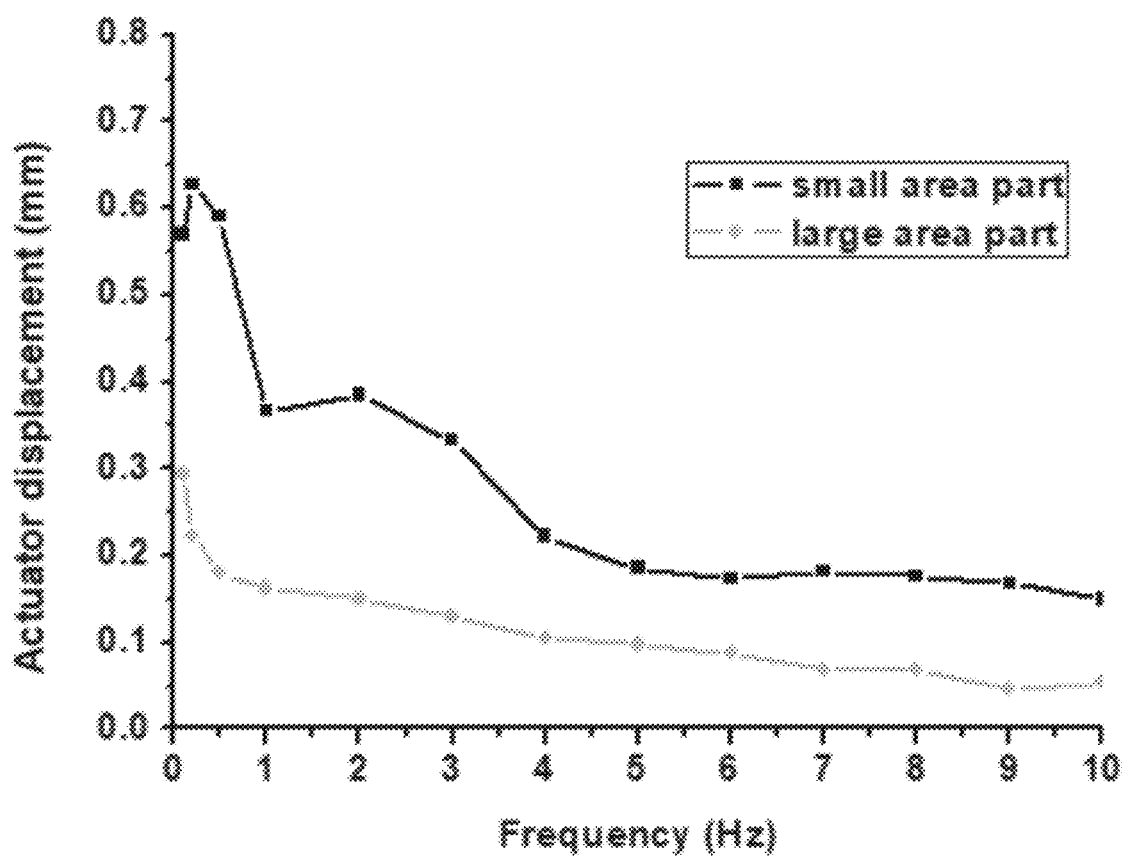
FIG. 6 is a graph showing the displacement as a function of the input frequency of first and second parts.

FIG. 6 shows the displacement and the actuation frequency at the center of each of the large area part and the small area part. The displacement of the large area part at 0.1 Hz, 0.2 Hz and 0.5 Hz are about 0.30 mm, 0.22 mm and 0.18 mm respectively. Here, as the frequency increases, the displacement tends to decrease. Additionally, the displacement of the small area part at 0.1 Hz, 0.2 Hz and 0.5 Hz is about 0.57 mm, 0.62 mm and 0.59 mm respectively. The displacement rapidly decreases at 1 Hz with the increasing frequency. Considering all the displacement results, it is concluded that the frequency of less than 1 Hz is a suitable range for the actuator 100.

In all cases, we observe that the displacement of the small area part is always higher than that of the large area part. This is the prominent feature of the asymmetric actuator 100 structure that can generate different inclinations.

B. Rotary Motion

A test is performed on the active plate 1000 in which the ball 1030 makes a circular motion in a predetermined trajectory without stopping.

Figure 7A:
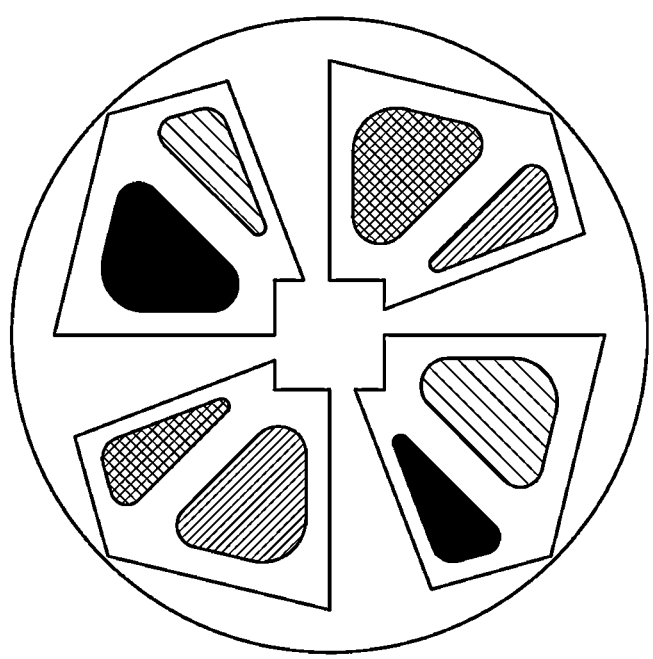
FIG. 7A is a conceptual diagram showing electrode connection to high voltage converters.
Figure 7B:
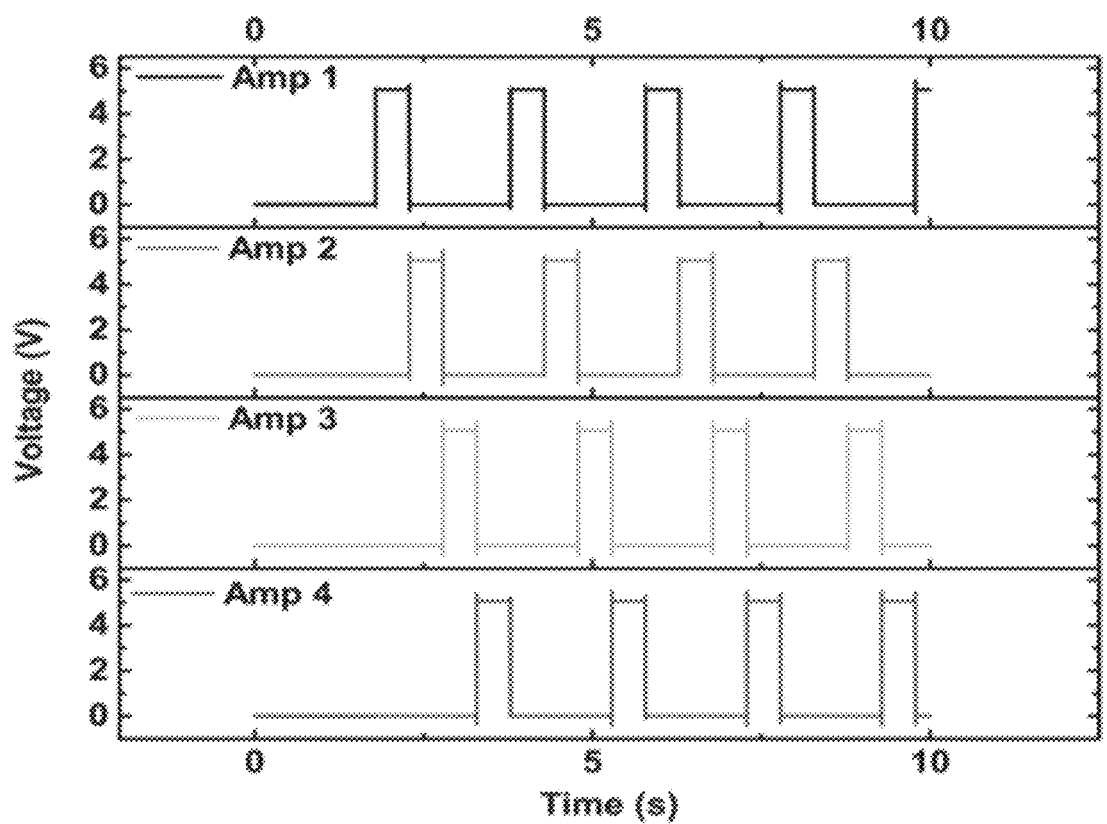
FIG. 7B is a graph showing the control input voltage for high voltage converters.

First, as shown in FIG. 7A, the large area part and the small area part of the actuator 100 facing diagonally form a pair. Each pair is connected in parallel to a high voltage converter, and four high voltage converters are used. The four high voltage converters are driven by a controller and sequentially turn on and off the actuator 100. The input control signal is a square wave having the frequency of 0.5 Hz and the duty ratio of 25% as shown in FIG. 7.

Figure 8:
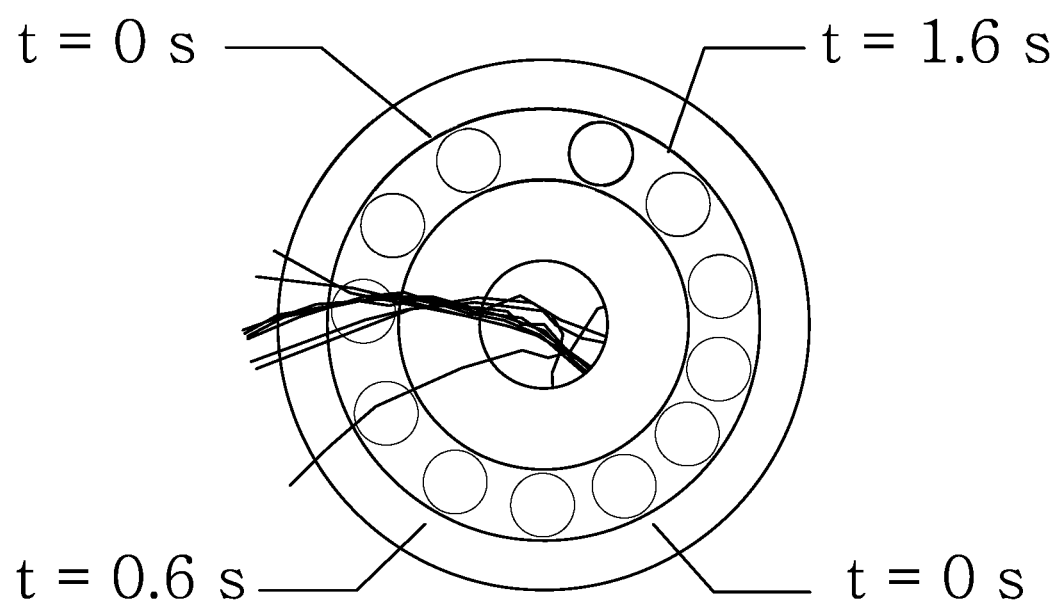
FIG. 8 is a photographic image showing the rotary motion of a ball over time.
Figure 9A:
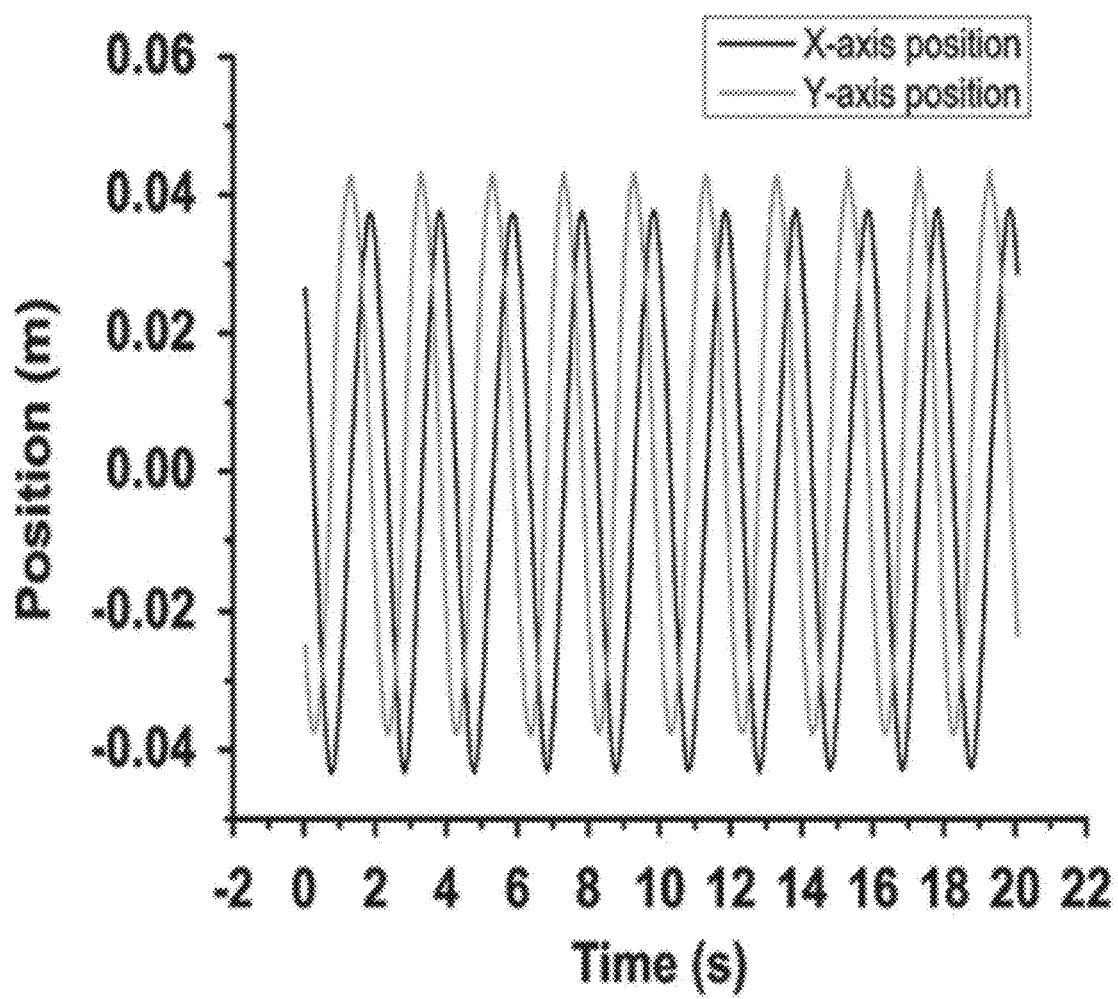
FIG. 9A is a graph showing the x- and y-axis position of a ball over time.
Figure 9B:
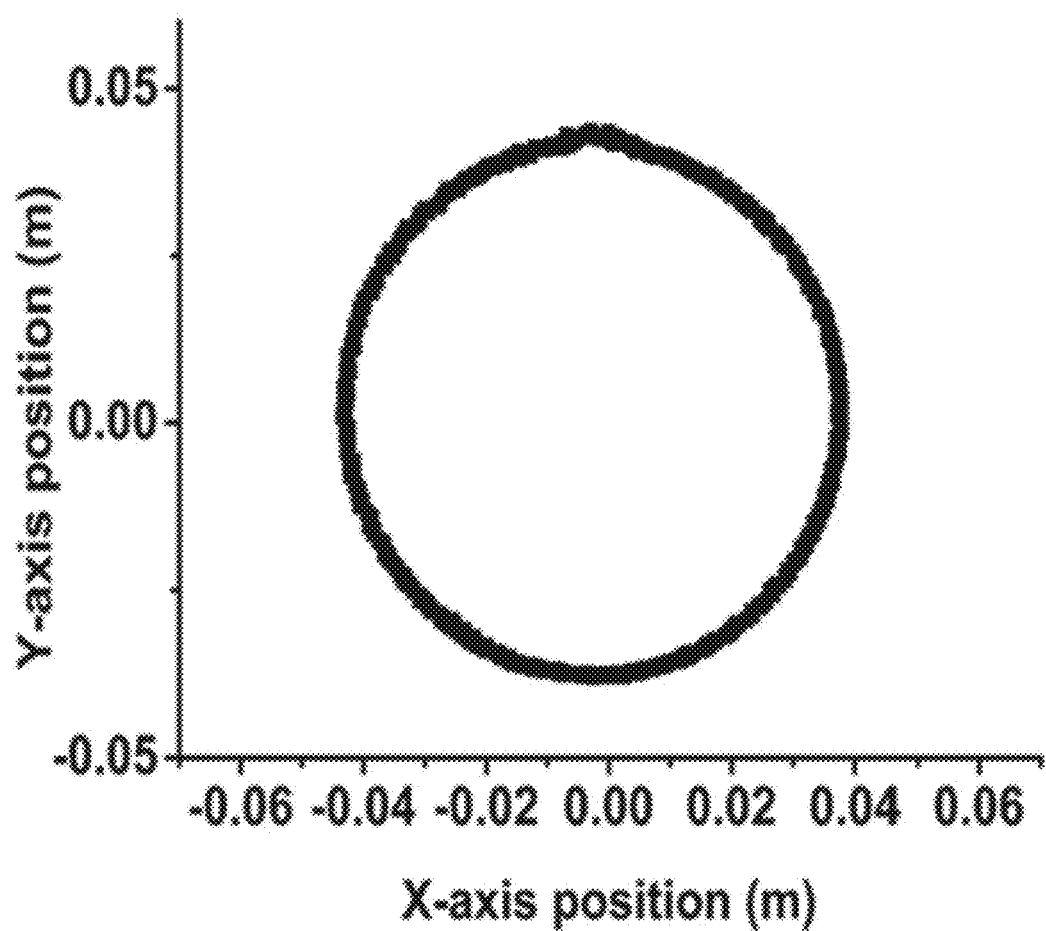
FIG. 9B is a graph showing the trajectory of a ball on the x-y.
Figure 9C:
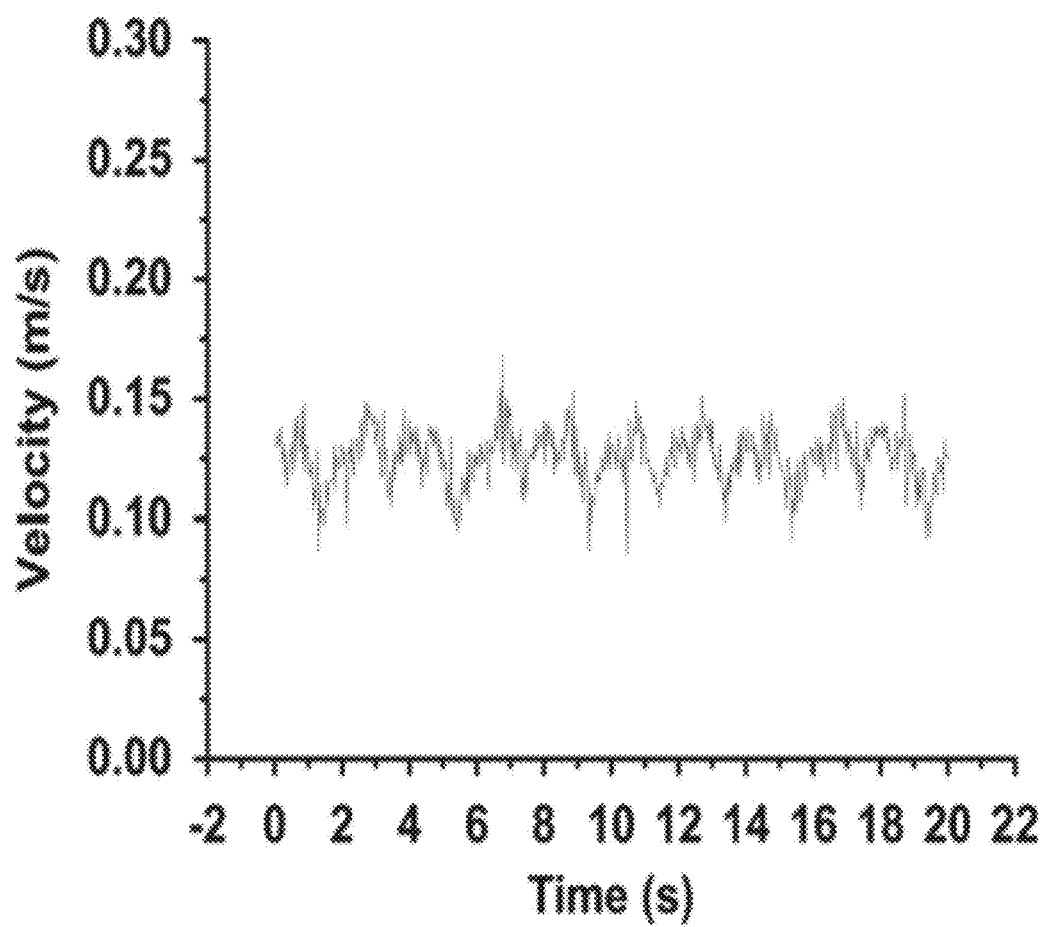
FIG. 9C is a graph showing the velocity of a ball over time.

FIG. 8 is a slow shutter speed photographic image of the movement of the ball 1030 when the ball 1030 rotates. A camera is used to observe the movement of the ball 1030. The camera captures images in the top view at the speed of 30 frames per second. The time displayed in FIG. 8 is the time at which the ball 1030 reached a specific location. A motion track program (ProAnalyst Motion Analysis Software) is used to extract the position of the ball 1030. FIG. 9 shows the results of ten counterclockwise rotations. The test results designate X axis position and Y axis position data of ten circular motions (FIG. 9A). When X-direction and Y-direction have sine wave representation, the position of the ball 1030 is observed. Additionally, the rotation frequency is 0.5 Hz corresponding to the control input frequency. Additionally, the trajectory of the ball 1030 forms a circle on the X-Y plane (FIG. 9B). The average velocity of the ball 1030 during the rotation is 0.13 m/s, and the standard deviation is 0.012 m/s (FIG. 9C).

C. Stop Position Control

The position of the ball 1030 moving in the housing may be controlled.

The ball 1030 may be stopped by the control of the actuator 100 within the housing. The rotating ball 1030 may stop at a desired target area. Eight areas are divided at the interval of 45°.

Figure 10:
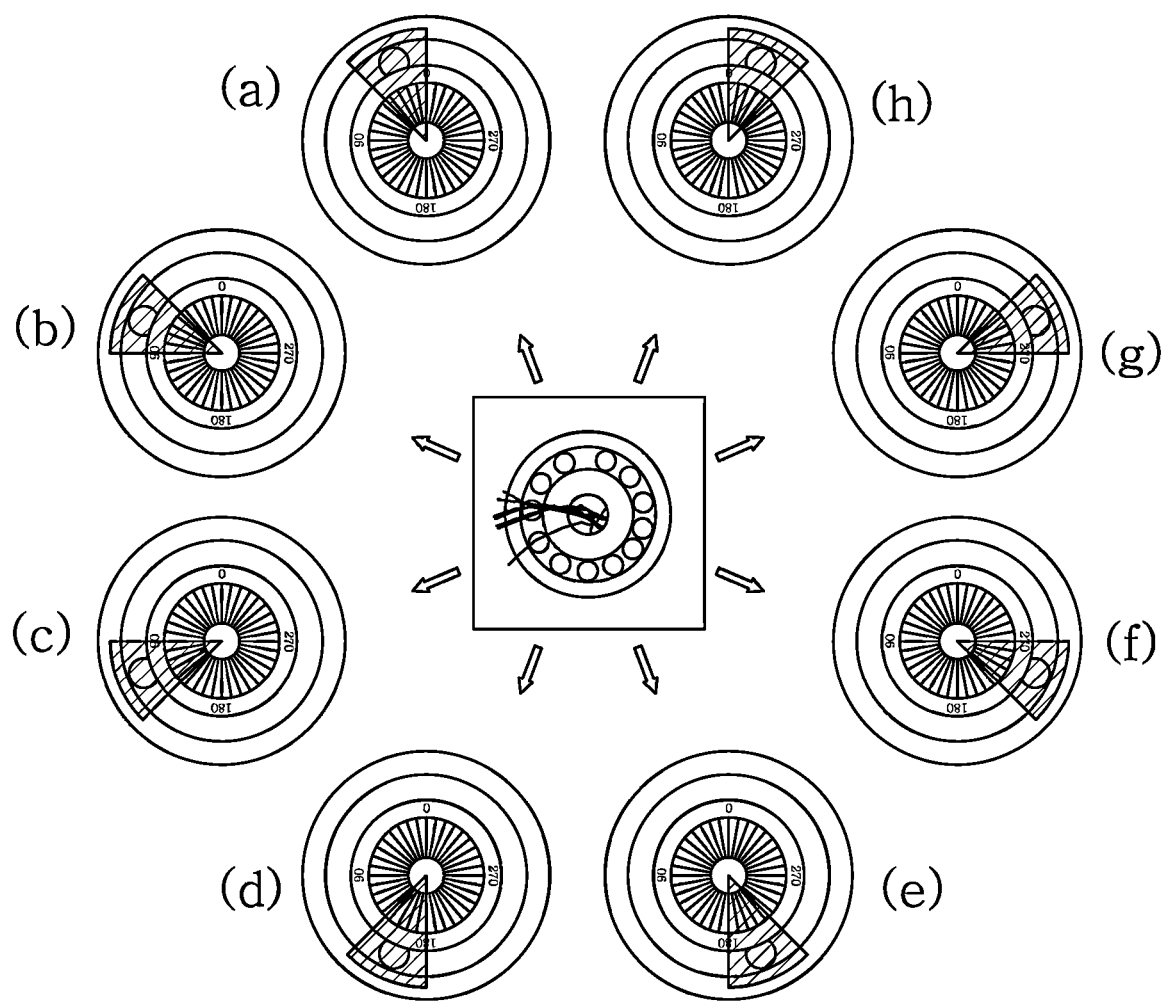
FIG. 10 is a conceptual diagram showing eight target positions in a ball's stop position experiment.

FIG. 10 shows a specific point at which the ball 1030 stopped. In this experiment, one of eight different inclinations is generated using the stop control input. That is, when the active plate 1000 maintains one tilt angle, the ball 1030 starts to slow down and stops at one point.

In detail, when one high voltage converter is turned on, the spherical object reaches one of the areas (a), (c), (e) and (g) in FIG. 10. In particular, due to the "ON" state of Amp 3, Amp 4, Amp 1 and Amp 2 of FIG. 11, the position of the ball 1030 is determined at the areas (a), (c), (e) and (g) in FIG. 10 respectively. However, four different positions are realized by the "ON" state of two high voltage converters. For example, when Amp 3 and Amp 4 are actuated, the ball 1030 may be disposed at the area (b). FIG. 11 shows a relationship between the stop position of the ball 1030 and the actuating converter.

The present disclosure provides the soft electrohydraulic actuator 100 having the asymmetric electrodes 30. The actuator 100 may work without an external fluid pressure source. In the actuator 100, the asymmetric electrodes 30 are divided into two parts: a small area part and a large area part. In this case, two types of deformations occur by the asymmetric electrodes 30 of the actuator 100.

Additionally, the present disclosure provides the active plate 1000 using the actuator 100. Four electrohydraulic actuators 100 having the asymmetric electrodes 30 are used in the active plate 1000, and the PVC plate is controlled by the four actuators 100. The inclination of the active plate 1000 may vary by the deformation of the four actuators 100. A series of tests is performed using the active plate and one glass ball 1030. The test is performed to determine whether the ball 1030 can continuously rotate or can be disposed at a desired area. For desired operation of the active plate 1000, a combination of tasks is used in the four actuators 100. The experimental results for tracking the movement of the ball 1030 show a predetermined trajectory on the same X-Y plane. Additionally, it is found that the ball 1030 can stop at desired target points.

The actuator 100 and the active plate 1000 of the present disclosure may be used for various purposes including soft robots, mobile robots and manipulators.

Additionally, the actuator 100 and the active plate 1000 of the present disclosure may be used in active tables that freely actuate on wide substrates.

The actuator 100 and the active plate 1000 described above is not limited to the configuration and method of the embodiments described above, and some or all the embodiments may be selectively combined to make various modifications.

It is obvious to those skilled in the art that the present disclosure may be embodied in other particular forms without departing from the spirit and essential features of the present disclosure. Therefore, the above detailed description should not be interpreted as being limiting in all aspects and should be considered as being exemplary. The scope of the present disclosure should be determined by the reasonable interpretation of the appended claims, and the scope of the present disclosure covers all modifications within the equivalent scope of the present disclosure.

DETAILED DESCRIPTION OF MAIN ELEMENTS

100: Actuator
10: Pouch
13: First part
15: Second part
20: Dielectric fluid
30: Electrode
33: First electrode
35: Second electrode
1000: Active plate
1020: Backing
1030: Ball

The invention claimed is:

1. An actuator, comprising:
a pouch which is sealed, and formed with an asymmetric structure;
a dielectric fluid which is filled in the pouch; and
electrodes which are attached respectively to one surface of the pouch and another surface opposite the one surface,
wherein the pouch includes:
a first part provided on one side and having a predetermined area; and
a second part provided on another side opposite the one side and having a smaller area than the first part,
wherein when power is applied to the electrodes, the first part or the second part of the pouch is expandable by movement of the dielectric fluid due to the asymmetric structure, and
wherein the electrodes include:

a first electrode attached to one surface of the first part and another surface opposite the one surface of the first part; and a second electrode attached to one surface of the second part and another surface opposite the one surface of the second part.

2. The actuator according to claim 1, wherein the pouch is formed by thermal bonding of two films.

3. The actuator according to claim 1, wherein the dielectric fluid is mineral oil.

4. An active plate, comprising:

the actuator according to claim 1; and a backing which is connected to the actuator, wherein a plurality of actuators is provided, and power applied to at least one actuator puts the actuators into operation.

5. The active plate according to claim 4, wherein the plurality of actuators is arranged adjacent to each other.

6. The active plate according to claim 4, wherein the backing has a circular shape, and the plurality of actuators is radially arranged on the circular backing.

7. The active plate according to claim 6, wherein the plurality of actuators is configured such that the first and second parts of each actuator are arranged in a sequential order.

8. The active plate according to claim 7, further comprising:

a housing which is coupled to the backing; and a ball moveably positioned in the housing to move by actuation of the plurality of actuators.

* * * * *